United States Patent [19]

Schwab

[11] Patent Number: 4,983,645

[45] Date of Patent: Jan. 8, 1991

[54] PHOTOINITIATORS AS LIGHT SENSITIVE DEGRADANTS FOR POLYETHYLENE

[75] Inventor: Frederick C. Schwab, Metuchen, N.J.

[73] Assignee: Mobil Oil Corporation, New York, N.Y.

[21] Appl. No.: 378,109

[22] Filed: Jul. 11, 1989

[51] Int. Cl.$^5$ .............................................. C08F 2/46
[52] U.S. Cl. .................................. 522/47; 525/333.7; 525/383; 523/125
[58] Field of Search .................... 523/125; 525/383; 522/47

[56] References Cited

U.S. PATENT DOCUMENTS

| | | | |
|---|---|---|---|
| 3,767,638 | 10/1973 | Johnson | 523/125 |
| 4,476,255 | 10/1984 | Bailey et al. | 523/125 |
| 4,544,359 | 10/1985 | Waknine | 523/116 |
| 4,548,687 | 10/1985 | Kitamura et al. | 524/474 |

*Primary Examiner*—Bernard Lipman
*Attorney, Agent, or Firm*—Alexander J. McKillop; Charles J. Speciale; Marina V. Schneller

[57] ABSTRACT

Small effective amounts of camphorquinone incorporated into polyethylene accelerates the degradation of polyethylene on exposure to ultraviolet light.

20 Claims, No Drawings

PHOTOINITIATORS AS LIGHT SENSITIVE DEGRADANTS FOR POLYETHYLENE

FIELD OF THE INVENTION

The invention relates to accelerating the photodegradation of polyethylene on exposure to ultraviolet light.

DESCRIPTION OF THE INVENTION

Polyethylene is used in packaging and disposable service were associated with the food packaging and fast-food service markets. In these applications, it can be desirable to provide the polyethylene as a composition which is photodegradable.

The current emphasis on ecology and in particular, the disposal of bulk rubbish, is in part directed to coping with the tremendous increase in the use of plastic containers and plastic films for packaging foodstuffs, and containing garbage and the like which not only present a serious disposal problem but increase unsightly litter in picnic areas, on roadsides and the like.

It is generally recognized that certain polyolefins such as polypropylene and polyethylene are photodegradable when exposed to ultraviolet light. Nevertheless, unlike steel containers which will rust away relatively rapidly, the actual decomposition of polyolefins is relatively slow and hence, despite some discoloration and/or embrittlement when exposed to sunlight, these plastic materials tend to remain substantially intact for relatively long periods of time.

The present invention relates to a composition of a linear polymer of ethylene containing effective amounts of the light sensitive photoinitiator camphorquinone which amounts are effective to accelerate the photodecomposition of the polyethylene on exposure to ultraviolet irradiation. The invention also relates to polyethylene compositions in film or package form which have been modified to render it more readily decomposable on exposure to ultraviolet light.

The invention relates to a composition of matter comprising photodegradable polyethylene and to a method for accelerating the degradation of polyethylene on exposure to ultraviolet light.

The present invention also includes food wrapped or contained in films or packaging materials formed from polyethylene modified in accordance with the invention.

The invention relates to a composition of a linear polymer which is a linear low density polyethylene or linear high density polyethylene and an amount of camphorquinone effective to accelerate the degradation of the ethylene polymer on exposure to ultraviolet light.

The amount of the camphorquinone can range from 0.0001 to 10 weight percent of the composition. Preferably, the amount of the camphorquinone can range from 0.0001 to 5 weight percent and most preferably from 0.0001 to 1 weight percent of the composition.

The camphorquinone can be introduced into the composition in any convenient manner, such as by direct addition or by introduction with a master batch containing an ethylene polymer and a higher concentration of the camphorquinone. The master batches then can be diluted with additional virgin ethylene polymer to achieve the necessary concentration in the composition as disclosed herein.

The ethylene polymer can be a high density polymer of ethylene or a linear low density polymer of ethylene. Linear low density ethylene polymers are copolymers of ethylene and a higher olefin and contain a sufficient amount of the higher olefin so that the copolymer has a density in the range of about 0.90 to about 0.94, preferably 0.91 to 0.93. The higher olefin is commonly 1-butene, 1-hexane, 4,methyl-1-pentane or 1-octene. Such materials are disclosed in U.S. Pat. No. 4,076,698 which is incorporated herein by reference in its entirety, and are widely available.

These compositions can be used as films, as skins on other biodegradable or photodegradable substrates or as packages per se which contain food. They may be fabricated as films or as packages by techniques known in the art.

These compositions can also contain, in addition to the camphorquinone, conventional ingredients, such as filler, antioxidants, stabilizers and the like.

The invention will be illustrated by the following examples.

EXAMPLES

Two levels of camphorquinone were blended (via Brabender at 185° C.) into a barefoot (unstabilized) LLDPE copolymer (butene comonomer) exposed to ultraviolet radiations in a QUV Weather-O-Meter for 200 hours. Loss in elongation (%) as a function of exposure time was measured.

| Time, Hrs | Camphorquinone, ppm | | |
|---|---|---|---|
| | 0 | 100 | 1000 |
| 0 | 100* | 100* | 100* |
| 50 | 100 | 96 | 73 |
| 100 | 100 | 79 | — |
| 150 | 79 | 47 | 14 |
| 200 | 41 | 12 | 6 |

*Elongation retained

Although the present invention has been described with respect to preferred embodiments, it is to be understood that modifications and variations may be made, without departing from the spirit and scope of this invention, as those skilled in the art will readily understand. Such modifications and variations are considered to be within the purview and scope of the appended claims.

What is claimed is:

1. A composition consisting essentially of linear polyethylene and an amount of camphorquinone which amount is effective to accelerate the degradation of the polyethylene on exposure to ultraviolet light.

2. The composition of claim 1, wherein the polyethylene is linear low density polyethylene.

3. The composition of claim 1 in which said linear polyethylene is high density polyethylene.

4. The composition of claim 1 in which the amount ranges from 0.0001 to 10 weight percent of the composition.

5. The composition of claim 1 wherein the amount ranges from 0.0001 to 5 weight percent of the composition.

6. The composition of claim 1 wherein the amount ranges from 0.0001 to 1 weight percent of the composition.

7. A method for accelerating the degradation of linear polyethylene on exposure to light comprising providing a linear polyethylene and compounding it with an amount of camphorquinone which amount is effective to accelerate the degradation of the polyethylene on exposure to ultraviolet light.

8. The method of claim 7 wherein the polyethylene is linear low density polyethylene.

9. The method of claim 7, wherein the polyethylene is high density polyethylene.

10. The method of claim 7, wherein the amount ranges from 0.0001 to 10 percent of the composition.

11. The method of claim 7 wherein the amount ranges from 0.0001 to 5 weight percent of the composition.

12. The method of claim 7 wherein the amount ranges from 0.001 to 1 weight percent of the composition.

13. The method of claim 7 which further includes exposing the polyethylene to ultraviolet light.

14. The method of claim 12 which further includes the subsequent step of exposing the polyethylene to ultraviolet light.

15. The method of claim 13, wherein prior to said step of exposing the polyethylene is fabricated into a film.

16. A composition consisting essentially of linear polyethylene and an amount of camphorquinone which amount is effective to accelerate the degradation of the polyethylene on exposure to ultraviolet light, which has been exposed to ultraviolet light to initiate said degradation.

17. The composition of claim 16, wherein the polyethylene is linear low density polyethylene.

18. The composition of claim 16, wherein the polyethylene is linear high density polyethylene.

19. The composition of claim 16 wherein the amount ranges from 0.001 to 5 weight percent of the composition.

20. The composition of claim 16 wherein the amount ranges from 0.0001 to 1 weight percent of the composition.

* * * * *

UNITED STATES PATENT AND TRADEMARK OFFICE
CERTIFICATE OF CORRECTION

PATENT NO. : 4,983,645

DATED : January 8, 1991

INVENTOR(S) : Frederick C. Schwab

It is certified that error appears in the above-identified patent and that said Letters Patent is hereby corrected as shown below:

Column 3, Line 8, after "10" insert --weight--

Signed and Sealed this

Nineteenth Day of May, 1992

*Attest:*

DOUGLAS B. COMER

*Attesting Officer*      *Acting Commissioner of Patents and Trademarks*